(12) United States Patent
Yukawa

(10) Patent No.: US 10,121,107 B2
(45) Date of Patent: Nov. 6, 2018

(54) MACHINE LEARNING DEVICE AND METHOD FOR OPTIMIZING FREQUENCY OF TOOL COMPENSATION OF MACHINE TOOL, AND MACHINE TOOL HAVING THE MACHINE LEARNING DEVICE

(71) Applicant: FANUC Corporation, Yamanashi (JP)

(72) Inventor: Fumito Yukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 334 days.

(21) Appl. No.: 15/042,839

(22) Filed: Feb. 12, 2016

(65) Prior Publication Data
US 2017/0091667 A1 Mar. 30, 2017

(30) Foreign Application Priority Data
Sep. 30, 2015 (JP) ................... 2015-193017

(51) Int. Cl.
*G06F 19/00* (2018.01)
*G06N 99/00* (2010.01)
(Continued)

(52) U.S. Cl.
CPC ......... *G06N 99/005* (2013.01); *G05B 19/404* (2013.01); *G06N 3/0427* (2013.01); *G05B 2219/33034* (2013.01)

(58) Field of Classification Search
CPC .. G06N 99/005; G06N 3/0427; G05B 19/404; G05B 2219/33034
See application file for complete search history.

(56) References Cited

U.S. PATENT DOCUMENTS 5,019,763 A 5/1991 Komatsu
5,357,439 A * 10/1994 Matsuzaki ....... G05B 19/41865
700/96
(Continued)

FOREIGN PATENT DOCUMENTS

CN 1758034 A 4/2006
CN 102576428 A 7/2012
(Continued)

OTHER PUBLICATIONS

Fines, John M., and Arvin Agah. "Machine tool positioning error compensation using artificial neural networks." Engineering Applications of Artificial Intelligence 21.7 (2008): 1013-1026.*
(Continued)

*Primary Examiner* — Michael D Masinick
(74) *Attorney, Agent, or Firm* — Hauptman Ham, LLP

(57) ABSTRACT

A machine learning device and a machine learning method for optimizing timing at which a tool is to be compensated in a machine tool, and a machine tool including the machine learning device. The machine learning device includes a state observation unit for observing a time interval for compensating the tool, a processing error amount of a workpiece processed by the machine tool, and a machine working ratio of the machine tool as state variables, and a learning unit for learning an action value with respect to a change of a tool compensation interval based on the tool compensation interval, the processing error amount of a workpiece, and the machine working ratio that are observed by the state observation unit.

10 Claims, 9 Drawing Sheets

(51) Int. Cl.
 *G05B 19/404* (2006.01)
 *G06N 3/04* (2006.01)

(56) References Cited

U.S. PATENT DOCUMENTS

| | | | | |
|---|---|---|---|---|
| 5,923,560 | A * | 7/1999 | Ozaki | G05B 19/404 |
| | | | | 409/186 |
| 7,274,165 | B2 * | 9/2007 | Takeuchi | G05B 19/404 |
| | | | | 318/567 |
| 2004/0186607 | A1 * | 9/2004 | Yoshinaga | B29C 45/76 |
| | | | | 700/109 |
| 2006/0161391 | A1 | 7/2006 | Inaba et al. | |
| 2006/0255759 | A1 * | 11/2006 | Takeuchi | G05B 19/404 |
| | | | | 318/574 |
| 2014/0350819 | A1 | 11/2014 | Johansson et al. | |
| 2015/0168938 | A1 | 6/2015 | Fujimoto et al. | |
| 2017/0091667 | A1 * | 3/2017 | Yukawa | G05B 19/404 |
| 2017/0154283 | A1 * | 6/2017 | Kawai | G06N 99/005 |

FOREIGN PATENT DOCUMENTS

| | | |
|---|---|---|
| JP | 2-39304 A | 2/1990 |
| JP | 4-135209 A | 5/1992 |
| JP | 5-138497 A | 6/1993 |
| JP | 7-104813 A | 4/1995 |
| JP | 2005-202844 A | 7/2005 |
| JP | 2015-134400 A | 7/2015 |

OTHER PUBLICATIONS

Lo, Chih-Ching, and Chao-Yin Hsiao. "A method of tool path compensation for repeated machining process." International Journal of Machine Tools and Manufacture 38.3 (1998): 205-213.*

* cited by examiner

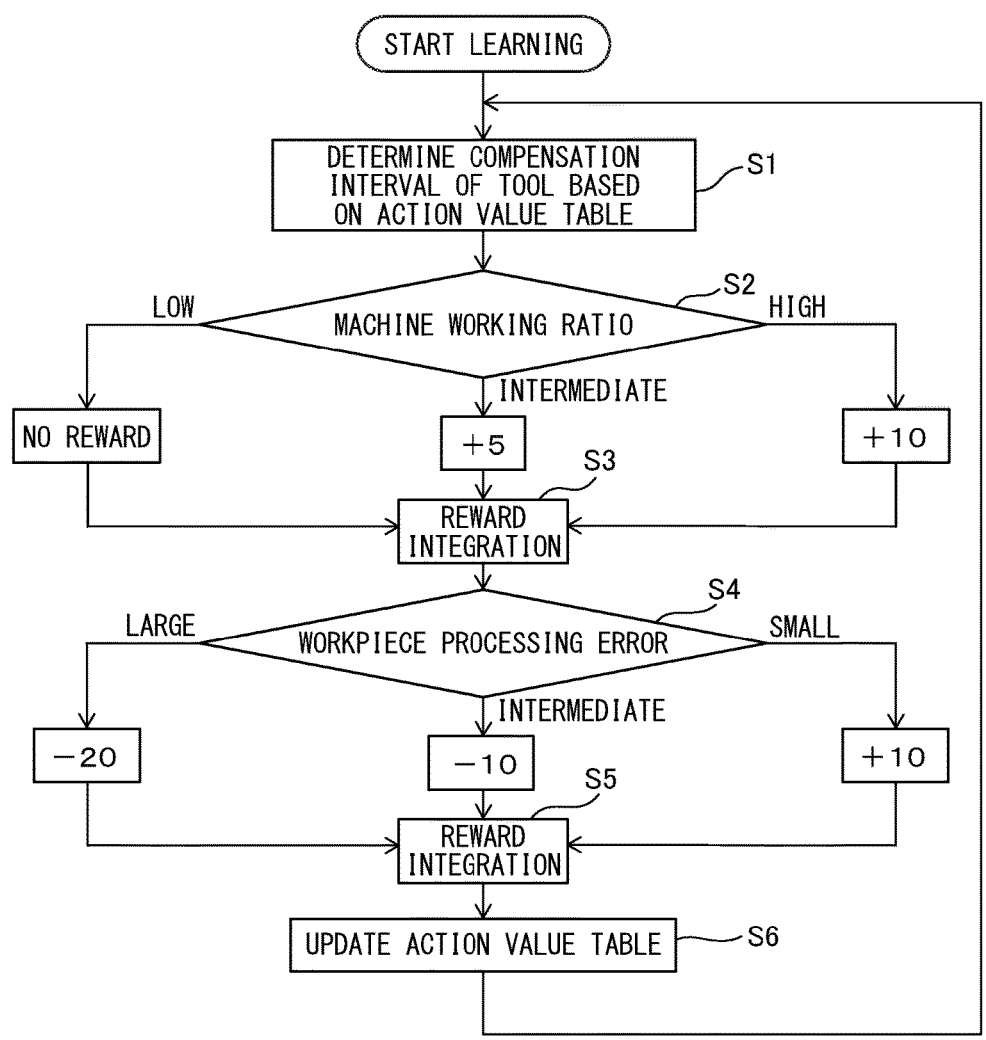

FIG. 6

| COMPENSATION INTERVAL | WORKPIECE ERROR AMOUNT | MACHINE WORKING RATIO | ACTION (COMPENSATION INTERVAL) | REWARD | ACTION VALUE |
|---|---|---|---|---|---|
| A | LARGE (−20) | HIGH (+10) | SHORTEN | −10 | |
| B | | HIGH (+10) | EXTEND | 0 | |
| B | | HIGH (+10) | SHORTEN | 0 | |
| C | | | EXTEND | −5 | |
| C | | | SHORTEN | −5 | |
| D | SMALL (+10) | | EXTEND | +15 | |
| D | SMALL (+10) | | SHORTEN | +15 | |
| E | SMALL (+10) | LOW (0) | EXTEND | +10 | |

INTERMEDIATE (−10)   INTERMEDIATE (+5)

FIG. 7

| COMPENSATION INTERVAL | WORKPIECE ERROR AMOUNT | MACHINE WORKING RATIO | ACTION (COMPENSATION INTERVAL) | REWARD | ACTION VALUE |
|---|---|---|---|---|---|
| A | LARGE (−20) | HIGH (+10) | SHORTEN | −10 | |
| B | | HIGH (+10) | EXTEND | 0 | |
| B | | HIGH (+10) | SHORTEN | 0 | −5 |
| C | | | EXTEND | −5 | |
| C | | | SHORTEN | −5 | |
| D | SMALL (+10) | | EXTEND | +15 | |
| D | SMALL (+10) | | SHORTEN | +15 | |
| E | SMALL (+10) | LOW (0) | EXTEND | +10 | |

INTERMEDIATE (−10)   INTERMEDIATE (+5)

FIG. 8

| COMPENSATION INTERVAL | WORKPIECE ERROR AMOUNT | MACHINE WORKING RATIO | ACTION (COMPENSATION INTERVAL) | REWARD | ACTION VALUE |
|---|---|---|---|---|---|
| A | LARGE (−20) | HIGH (+10) | SHORTEN | −10 | |
| B | | HIGH (+10) | EXTEND | 0 | |
| B | | HIGH (+10) | SHORTEN | 0 | −5 |
| C | | | EXTEND | −5 | |
| C | | | SHORTEN | −5 | +15 |
| D | SMALL (+10) | | EXTEND | +15 | |
| D | SMALL (+10) | | SHORTEN | +15 | |
| E | SMALL (+10) | LOW (0) | EXTEND | +10 | |

INTERMEDIATE (−10)   INTERMEDIATE (+5)

FIG. 9

| COMPENSATION INTERVAL | WORKPIECE ERROR AMOUNT | MACHINE WORKING RATIO | ACTION (COMPENSATION INTERVAL) | REWARD | ACTION VALUE |
|---|---|---|---|---|---|
| A | LARGE (−20) | HIGH (+10) | SHORTEN | −10 | 0 |
| B | | HIGH (+10) | EXTEND | 0 | −10 |
| B | | HIGH (+10) | SHORTEN | 0 | −5 |
| C | | | EXTEND | −5 | 0 |
| C | | | SHORTEN | −5 | 15 |
| D | SMALL (+10) | | EXTEND | +15 | −5 |
| D | SMALL (+10) | | SHORTEN | +15 | 10 |
| E | SMALL (+10) | LOW (0) | EXTEND | +10 | 15 |

INTERMEDIATE (−10)   INTERMEDIATE (+5)

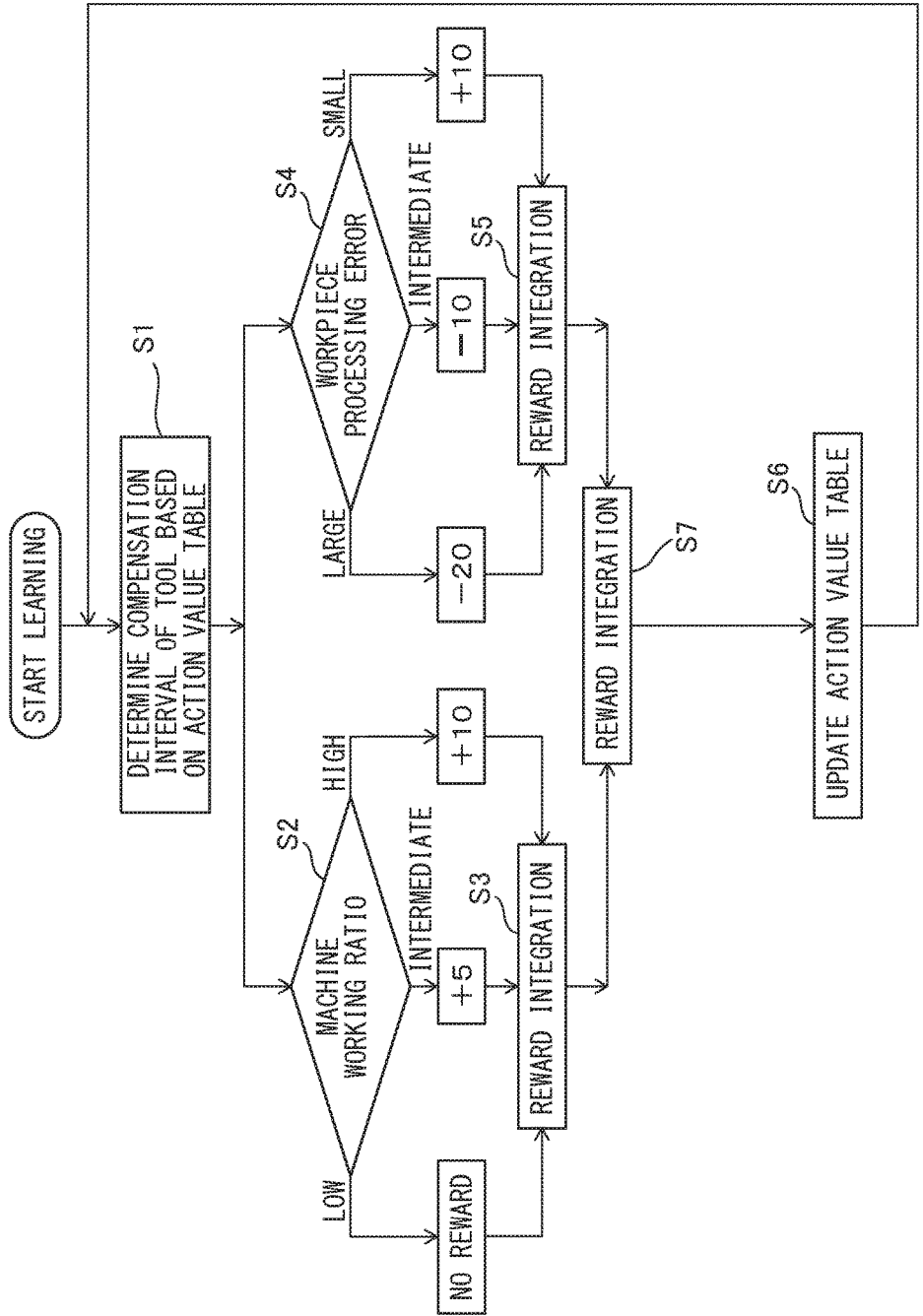

MACHINE LEARNING DEVICE AND METHOD FOR OPTIMIZING FREQUENCY OF TOOL COMPENSATION OF MACHINE TOOL, AND MACHINE TOOL HAVING THE MACHINE LEARNING DEVICE

BACKGROUND OF THE INVENTION

1. Field of the Invention

The present invention relates to a machine learning device and a machine learning method for optimizing timing at which a tool is to be compensated in a machine tool, and a machine tool including the machine learning device.

2. Description of the Related Art

Recently, high accuracy processing in a machine tool has been more and more demanded, and accordingly, a so-called tool compensation that compensates a blade tip position of a tool in consideration of an abrasion amount of a blade tip of the tool of the machine tool and an effect of a thermal displacement of the machine tool is performed.

In a conventional machine tool, the frequency of performing the tool compensation is often determined based on experiences by the operator. Specifically, an extraction inspection of the size of a workpiece processed by the machine tool is performed, and whether or not the operator performs the tool compensation based on a result of the inspection is determined.

In addition, to reduce labor of the operator, a technique of automatically performing a tool compensation has been proposed. For example, JP H07-104813 A describes a numerical controller including a compensation data storage element for storing compensation data as history data each time a tool compensation is performed, and a tool compensation instruction element for automatically instructing a tool compensation with respect to tool data of a processing program instructed by a numerical control machine tool.

Further, JP 2005-202844 A describes a numerical controller including an initial compensation amount input element for inputting an initial compensation amount for compensating a displacement amount of a tool, a compensation amount storage processing element for storing the compensation amount as history data each time a compensation of a tool displacement amount is performed, a tool compensation amount determination element for determining a compensation amount based on the compensation amount input to the initial compensation amount input element and the history data, and a compensation means for compensating a displacement amount of the tool based on the determined compensation amount.

Conventional tool compensations have been performed mainly for maintaining a processing accuracy. In other words, if the frequency of a tool compensation is too low, a processing accuracy of a workpiece lowers and in some cases defective products are produced. However, on the contrary, if the frequency of a tool compensation is too high, there occurs a problem in that a working ratio of a machine tool lowers. An optimal value for the frequency of a tool compensation exists, whereas, in view of two points in terms of processing accuracy and working ratio, an effective method or an element for determining an optimal value of the frequency of a tool compensation has thus never been conventionally proposed.

SUMMARY OF THE INVENTION

Thus, an object of the present invention is to provide a machine learning device and a machine learning method that can optimize the frequency of a tool compensation of a machine tool, and a machine tool including the machine learning device.

To achieve the above object, one aspect of the present invention provides a machine learning device for learning an action value with respect to a change of a tool compensation interval that is a time interval for compensating a tool in a machine tool, the device including: a state observation unit for observing the tool compensation interval of the machine tool, a processing error amount of a workpiece processed by the machine tool, and a machine working ratio of the machine tool as state variables; and a learning unit for learning by associating the tool compensation interval, the processing error amount, and the machine working ratio that are observed by the state observation unit with a change amount of the tool compensation interval.

In a preferred embodiment, the learning unit includes a reward calculation unit for calculating a reward based on the tool compensation interval, the processing error amount of a workpiece, and the machine working ratio, and a function update unit for creating or updating an action value table based on the tool compensation interval, the processing error amount, the machine working ratio, and the reward.

In a preferred embodiment, the machine learning device further includes a decision making unit for determining a change amount of the tool compensation interval based on the action value table.

In a preferred embodiment, the reward calculation unit provides a negative reward when the processing error amount of a workpiece increases or the machine working ratio decreases, and provides a positive reward when the processing error amount of a workpiece decreases or the machine working ratio increases.

In a preferred embodiment, the learning unit computes state variables observed by the state observation unit using a multilayer structure.

In a preferred embodiment, the function update unit updates the action value table thereof using an action value table updated by another learning machine device.

Further, the present invention provides the machine tool including the above machine learning device.

In a preferred embodiment, the state observation unit further observes a temperature inside the machine tool, and the learning unit learns by associating the tool compensation interval, the processing error amount, the machine working ratio, and the temperature inside the machine tool that are observed by the state observation unit with a change amount of the tool compensation interval.

Another aspect of the present invention provides a machine learning method for learning an action value with respect to a change of a tool compensation interval that is a time interval for compensating a tool in a machine tool, the method including: a step of observing the tool compensation interval of the machine tool, a processing error amount of a workpiece processed by the machine tool, and a machine working ratio of the machine tool as state variables; and a step of learning by associating the tool compensation interval, the processing error amount, and the machine working ratio that are observed by the state observation unit with a change amount of the tool compensation interval.

In a preferred embodiment, the step of learning includes a step of calculating a reward based on the tool compensation interval, the processing error amount of a workpiece, and the machine working ratio, and a step of creating or updating an action value table based on the tool compensation interval, the processing error amount, the machine working ratio, and the reward.

BRIEF DESCRIPTION OF THE DRAWINGS

The above or other objects, features, and advantages of the present invention will be further apparent from the description of the following preferred embodiments with reference to the accompanying drawings.

FIG. 5 is a flowchart illustrating an example of processing of reinforcement learning in the machine tool of FIG. 1;

FIG. 6 is a diagram illustrating a specific example of an action value table that is created or updated by machine learning;

FIG. 7 is a diagram illustrating a specific example of the action value table that is created or updated by the machine learning;

FIG. 8 is a diagram illustrating a specific example of the action value table that is created or updated by the machine learning;

FIG. 9 is a diagram illustrating a specific example of the action value table that is created or updated by the machine learning;

FIG. 10 is a flowchart illustrating an example of processing of the reinforcement learning in the machine tool of FIG. 1;

DETAILED DESCRIPTION

Figure 1:
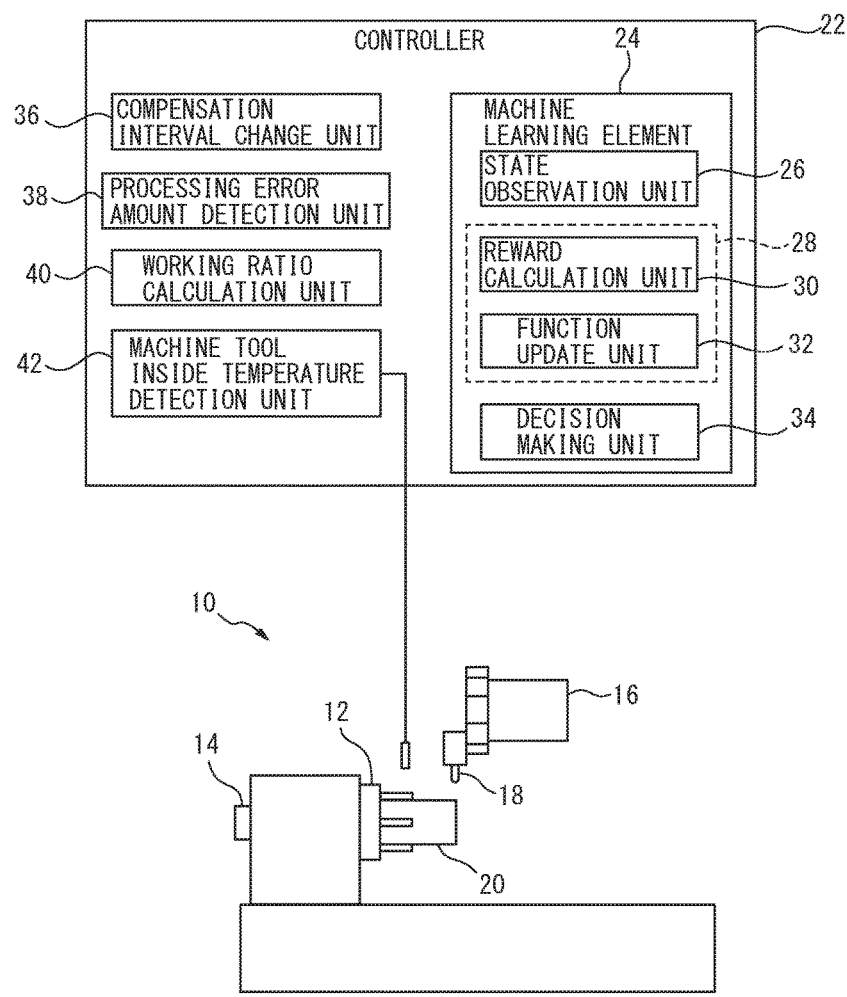
FIG. 1 is a diagram illustrating a schematic configuration of a machine tool including a learning controller according to the present invention.

FIG. 1 is a function block diagram illustrating a schematic configuration of a machine tool 10 according to an embodiment of the present invention. The machine tool 10 as illustrated is a numerical controller, such as an NC lathe, includes a spindle 14 including a chuck 12, and a tool 18 held by a tool rest 16, and is configured in such a manner as to perform machine processing of a workpiece 20 to be processed (for example, a cylindrical workpiece) that is held by the chuck 12.

The machine tool 10 includes a controller 22, such as a numerical controller, that controls the operation of the machine tool 10, and a machine learning element (machine learning device) 24 that performs machine learning as described below. Note that the machine learning element 24 may be incorporated in the controller 22 as illustrated, and may be configured as a constituting element separate from the controller 22.

The machine learning element 24 includes a state observation unit 26 that observes, as state variables, a time interval of compensation of (the length of) the tool 18 (hereinafter referred to as tool compensation interval), a processing error amount of the workpiece 20 processed by the machine tool 10, and a machine working ratio of the machine tool 10, and a learning unit 28 that learns by associating the tool compensation interval, the processing error amount, and the machine working ratio that are observed by the state observation unit 26 with a change amount of the tool compensation interval. Further specifically, the learning unit 28 performs learning of an action value (creation or update of an action value table as described below) with respect to a change of the tool compensation interval based on the tool compensation interval, the processing error amount of the workpiece, and the machine working ratio that have been observed by the state observation unit 26.

Note that the learning unit 28 can perform various machine learning, such as supervised learning, unsupervised learning, semi-supervised learning, reinforced learning, transduction, and multitask learning, as described below, but hereinafter the description will be given based on the assumption that the learning unit 28 performs reinforcement learning.

The learning unit 28 includes a reward calculation unit 30 that calculates a reward based on a state (the tool compensation interval, the processing error amount of the workpiece, and the machine working ratio) observed by the state observation unit 26, and a function update unit 32 (artificial intelligence) that updates an action value function in the change of the tool compensation interval (for example, the action value table as described below) based on the reward calculated by the reward calculation unit 30.

Further, the machine learning element 24 includes a decision making unit 34 that decides and outputs the change amount of the tool compensation interval based on a learning result of the learning unit 28. Note that the decision making unit 34 may not be included in the machine learning element 24, and, for example, may be included in the controller 22.

On the other hand, the controller 22 includes a compensation interval change unit 36 that changes the tool compensation interval based on the change amount of the tool compensation interval output from the decision making unit 34, a processing error amount detection unit 38 that detects the processing error amount of the workpiece based on the size of the processed workpiece that is measured after the lapse of time corresponding to the changed tool compensation interval, and a working ratio calculation unit 40 that calculates a working ratio of the machine tool 10. Note that, after the lapse of time corresponding to the changed tool compensation interval, an alarm for urging the operator to measure the size of the processed workpiece may be output. Further, there is also a case in which change of the tool is to be performed in place of compensation of the tool depending on a result of a size measurement of the processed workpiece (in other words, a case in which an abrasion amount of the tool is large, which fails to be dealt with by the tool compensation), and such a case is included in the tool compensation in this application.

Further, the controller 22 may optionally include a machine tool inside temperature detection unit 42 that detects the temperature in the machine tool 10. Note that functions of the compensation interval change unit 36, the processing error amount detection unit 38, the working ratio calculation unit 40, and the machine tool inside temperature unit 42 may be performed by another constituting element other than the controller 22, and in such a case, detection data and calculation data from the other constituting element may be stored in a storage unit (unillustrated) in the controller 22, such as a memory.

A specific example of the tool compensation will be described with reference to FIG. 2. A compensation interval (compensation frequency) of the tool may be determined based on the state of the progress of the abrasion of the tool, while the state of the abrasion of the tool may be estimated based on the processing error amount of the workpiece as described above.

Figure 2:
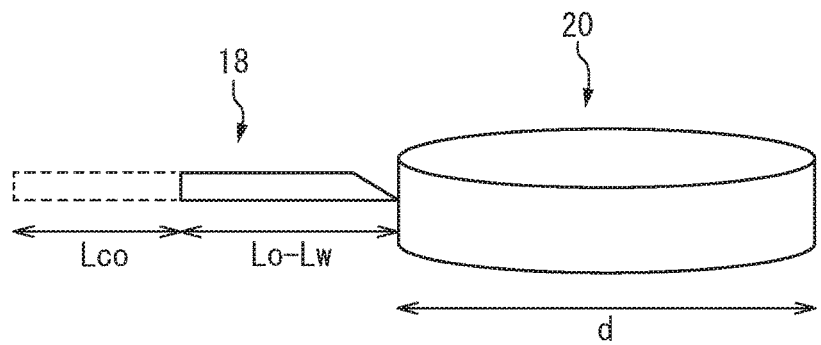
FIG. 2 is a diagram illustrating an example of a compensation process of a tool.

For example, as illustrated in FIG. 2, in a case in which the tool compensation for displacing a blade tip of the tool 18 toward the workpiece 20 by length $L_{co}$ is performed when the length of the tool 18 (tool length) is shortened from initial length $L_0$ by $L_w$ due to the abrasion following machine processing, tool compensation amount $L_{co}$ is set such that diameter d of the processed workpiece 20 is equal to dmin (dmin is a minimum allowable size of workpiece diameter d). Accordingly, the diameter of the workpiece processed immediately after the tool compensation is dmin, and thereafter the diameter of the processed workpiece gradually enlarges as the abrasion of the tool progresses until the following tool compensation is performed.

Then, when the diameter of the processed workpiece reaches dmax (dmax is a maximum allowable size of workpiece diameter D), the tool compensation is to be performed, while, when the workpiece diameter is da immediately before the tool compensation is actually performed based on the set tool compensation interval, a difference between dmax and da is determined. In a reward calculation as described below, the smaller the difference (workpiece processing error amount) is, the greater reward is provided. In other words, in this example, a change amount of the tool compensation interval is determined such that the tool compensation is performed at a very timing at which a processing error of the workpiece falls within a predetermined tolerance.

Note that the compensation frequency of the tool may be determined in consideration of the state of the abrasion as described above as well as a degree of thermal expansion. For example, since a cutting resistance varies depending on a cutting depth of the tool and the temperature of the workpiece accordingly varies, measuring the temperature of the workpiece using the above machine tool inside temperature detection unit 42 or estimating the workpiece temperature based on the temperature inside the machine tool adjacent to the workpiece allows a thermal expansion amount of the workpiece to be calculated.

Figure 3:
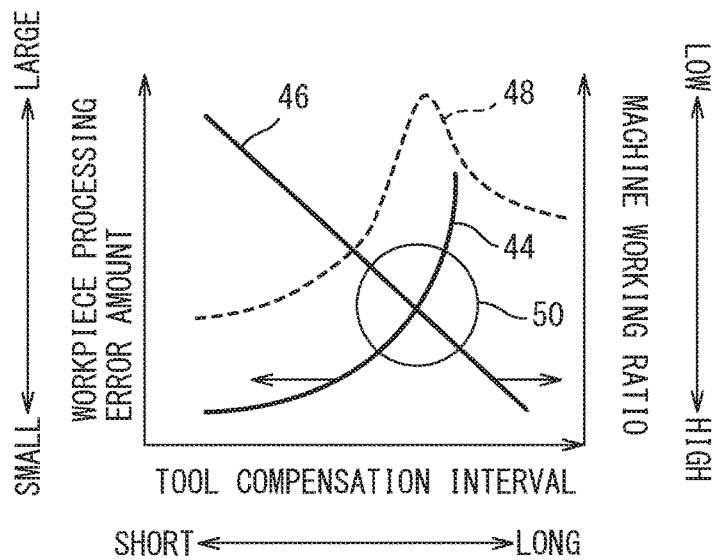
FIG. 3 is a diagram illustrating a basic idea of machine learning in the present invention.

Hereinafter, machine learning (reinforcement learning) of the machine learning element 24 will be described. FIG. 3 is a diagram illustrating a basic idea of the machine learning in the present invention. In general, as indicated by a graph 44 in FIG. 3, the processing error amount of the workpiece processed by the machine tool is larger as the tool compensation interval is longer, while, as illustrated by a graph 46, the machine working ratio of the machine tool is higher as the tool compensation interval is longer. Note that the machine working ratio herein is expressed, for example, by the ratio of an actual working time obtained by subtracting a downtime including a time required for the tool compensation, and the like, from a working expectation time to the scheduled working expectation time.

As is clear from FIG. 3, when the tool compensation interval is a variable, the workpiece processing error amount and the machine working ratio are in a so-called tradeoff relationship, and thus, in the present invention, the optimal tool compensation interval is determined by the machine learning. In FIG. 3, the reinforcement learning, as indicated by a graph 48, in which the reward calculation is performed using the tool compensation interval as a parameter and the tool compensation interval enabling a higher reward is learned is illustrated, and a region enclosed by a region 50 (region providing a high reward) is a learning target part.

Figure 4:
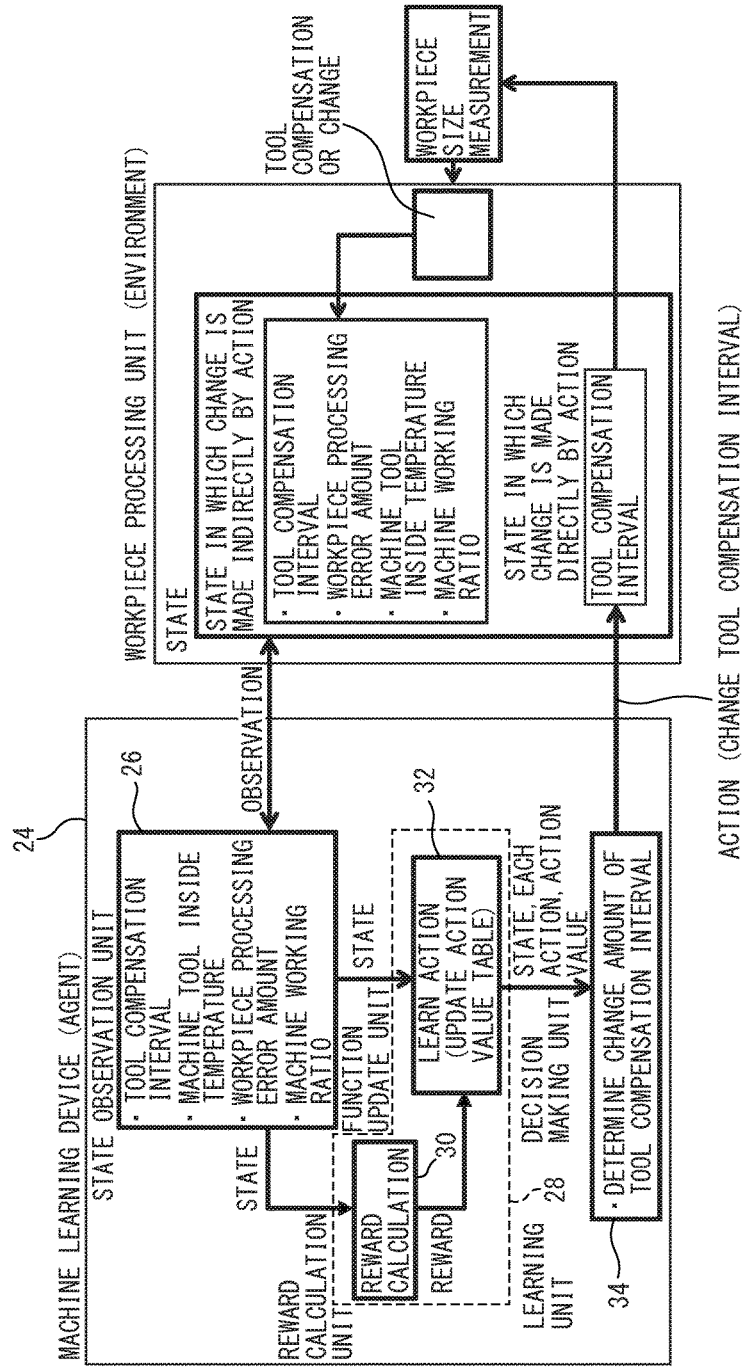
FIG. 4 is a diagram illustrating a relationship between a machine learning device (agent) and a workpiece processing unit (environment) of the machine tool.

Next, an example of the machine learning (reinforcement learning) in the machine tool 10 of FIG. 1 will be described. Note that, as illustrated in FIG. 4, the machine learning element 24 in the present embodiment corresponds to an agent in the reinforcement learning. Meanwhile, the compensation interval change unit 36, the processing error amount detection unit 38, the working ratio calculation unit 40, and the machine tool inside temperature unit 42 have a function of detecting or calculating the state of an environment (herein the tool compensation interval, the workpiece processing error amount, the machine working ratio, and the machine tool inside temperature).

FIG. 5 is a flowchart illustrating an example of a reinforcement learning method in the machine tool 10 of FIG. 1. First, in step S1, the compensation interval (compensation frequency) of the tool is determined based on the action value table as described below. Next, the machine working ratio in the determined tool compensation interval is calculated (step S2), and a reward according to a calculation result is determined (step S3). Herein, as an example, the determined machine working ratio is classified based on proper two threshold values (i.e., a first threshold value and a second threshold value greater than the first threshold value), and a reward for the working ratio lower than the first threshold value is 0, a reward for the working ratio higher than the second threshold value is +10, and a reward for the working ratio higher than or equal to the first threshold value and lower than or equal to the second threshold value is +5.

Next, the processing error amount of the workpiece in the tool compensation interval determined in step S1 is determined (step S4), and a reward according to a calculation result is determined (step S5). Herein, as an example, the determined processing error amount is classified based on proper two threshold values (i.e., a third threshold value and a fourth threshold value greater than the third threshold value), and a reward for the error amount lower than the third threshold value is +10, a reward for the error amount higher than the fourth threshold value is −20, and a reward for the error amount higher than or equal to the third threshold value and lower than or equal to the fourth threshold value is −10.

Lastly, the reward with respect to the machine working ratio and the reward with respect to the processing error amount are integrated with each other, and taking the integrated reward as a reward for the tool compensation interval determined in step S1, the action value table is updated (step S6). Processing in steps S1 to S6 is repeated each time the tool compensation interval is updated.

In the example of FIG. 5, the reward calculation unit 30 as described above provides a negative reward when the workpiece processing error amount increases or the machine working ratio decreases, and provides a positive reward when the workpiece processing error amount decreases or the machine working ratio increases, whereby an optimal interval (frequency) of the tool compensation can be learned.

In FIGS. 6-9, specific examples of the action value table created or updated by the above machine learning are indicated. Here, the compensation interval of the tool is set to have five stages, and conditions A, B, C, D, and E are provided in descending order of the length of the compensation interval (in ascending order of the compensation frequency). In the conditions B, C, and D, two ways of determination (action) of the following tool compensation interval can be considered so that the action value table contains eight patterns.

As indicated by an arrow 52 in FIG. 6, first, when the tool compensation interval corresponds to the condition B, it is supposed that an action (pattern) that shortens the following compensation interval is selected. As a result of the selection, the tool compensation interval comes to correspond to the condition C, so that as indicated by an arrow 54 or 56 in FIG. 7, a reward is −5. Accordingly, as illustrated in FIG. 7, an action value of the pattern indicated by the arrow 52 in FIG. 6 is set to be −5 (in other words, the action value table is updated).

In FIG. 7, when the tool compensation interval corresponds to the condition C, it is supposed that an action (i.e., a pattern indicated by the arrow 56) that further shortens the following compensation interval is selected. As a result of the selection, the tool compensation interval comes to correspond to the condition D, so that as indicated by an arrow 58 or 60 in FIG. 8, a reward is +15. Accordingly, as illustrated in FIG. 8, an action value of the pattern indicated by the arrow 56 in FIG. 7 is set to be +15 (in other words, the action value table is updated).

The selection and update as described above is repeated, whereby the action value table in which an action value with respect to each pattern is set as indicated in FIG. 9 is obtained and the optimal tool compensation interval can be determined.

FIG. 10 is a flowchart illustrating another example of the reinforcement learning method in the machine tool 10 of FIG. 1. The example of FIG. 10 illustrates a case in which the state variables observed by the state observation unit are computed using a multilayer structure, such as a multilayer neural net to perform deep learning, and in such deep learning, a plurality of reward calculations can be simultaneously performed and the action value table can be updated in a real time manner.

In detail, in the example as illustrated in FIG. 10, a reward calculation with respect to the machine working ratio described in FIG. 5 (steps S2, S3) and a reward calculation with respect to the workpiece processing error amount (steps S4, S5) are processed in parallel, and a step S7 in which each reward is integrated with each other is added. The other parts in the flowchart of FIG. 10 may be similar to the flowchart of FIG. 5, and thus the detailed description thereof will be omitted.

Figure 11:
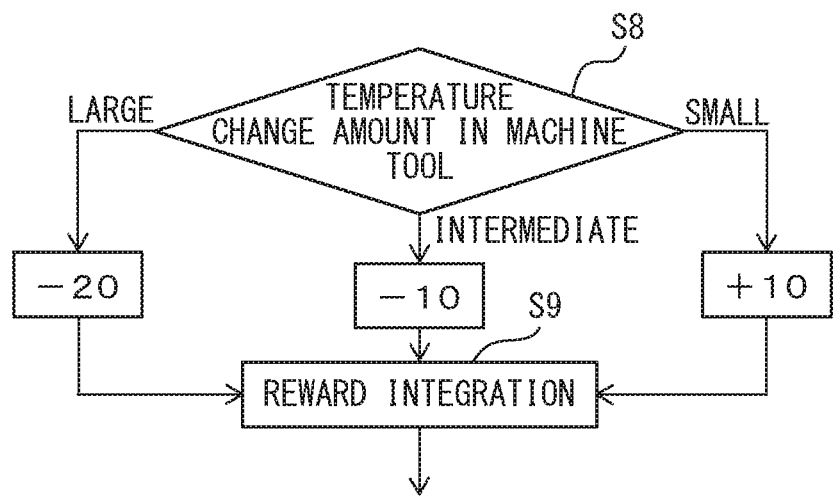
FIG. 11 is a flowchart illustrating an example of processing in which the temperature in the machine tool is further used in the reinforcement learning in the machine tool of FIG. 1.

FIG. 11 is a flowchart illustrating an example in which, in addition to the machine working ratio and the workpiece processing error amount as described above, the machine tool inside temperature is further used as a variable used for reward calculation. As described above, since a thermal expansion amount of the workpiece changes depending on the temperature in the machine tool, a temperature change amount in the machine tool 10 is determined using the machine tool inside temperature detection unit 42 or the like so that a reward according to a calculation result can be determined (steps S8, S9). Herein, as an example, the determined temperature change amount is classified based on proper two threshold values (i.e., a fifth threshold value and a sixth threshold value greater than the fifth threshold value), and a reward for the temperature change amount lower than the fifth threshold value is +10, a reward for the temperature change amount higher than the sixth threshold value is −20, and a reward for the temperature change amount higher than or equal to the fifth threshold value and lower than or equal to the sixth threshold value is −10.

Note that processing illustrated in FIG. 11 (steps S8, S9) may be inserted between steps S3 and S4 or between steps S5 and S6 in the flowchart of FIG. 5, or may be inserted between steps S7 and S6 in the flowchart of FIG. 10. Taking also the temperature change amount when rewards are thus calculated allows accuracy and reliability of the machine learning to be further improved.

Note that, in the above embodiments, the action value table created or updated by the machine learning device 24 (function update unit 32) may be used in other machine learning devices of the same type. In other words, the machine learning device 24 may create or update its action value table using an action value table created or updated by the other machine learning devices of the same type. In this manner, an action value table in which learning has sufficiently progressed can be used without updating the action value table by employing time.

The machine learning device 24 illustrated in FIG. 1 will be described in detail. The machine learning device 24 has a function of extracting, from a set of data input to the device, a useful rule, knowledge representation, determination standard, and the like therein by analysis and outputting a determination result thereof, while performing learning of knowledge. There are various methods, which may be roughly classified into "supervised learning," "unsupervised learning," and "reinforcement learning." Further, to realize the methods, there is a method called "deep learning" in which extraction of a feature amount itself is learned.

In the "supervised learning," a set of data of a certain input and a result (label) in a large amount is provided to a learning device, thereby learning a feature, and a model of estimating the result based on the input, in other words, a relationship thereof can be recursively obtained. In the present embodiment, use can be made for parts for estimating the optimal tool compensation interval based on the machine working ratio and the workpiece processing error amount, and the like. Realization can be made using an algorithm, such as a neural network as described below.

The "unsupervised learning" is a method of learning how input data is distributed by providing only the input data to a learning device, and learning a device that performs compression, classification, modification, and the like with respect to the input data without being provided with corresponding supervision output data. Features in the data set can be clustered into those resemble each other. Using the result, providing a certain standard and performing such an output allocation as to optimize the same, whereby prediction of output can be realized. Meanwhile, as an intermediate problem setting between the "supervised learning" and the "unsupervised learning," there is so-called "semi-supervised learning," which corresponds to a case in which a set of data of input and output exists only partially, the other of which is data of input only. In the present embodiment, data that can be obtained without actually actuating a magnetization device is used in the unsupervised learning and learning can be efficiently performed.

A problem of the reinforcement learning is set as described below.

The machine tool (controller) observes the state of an environment and determines an action.

The environment changes in accordance with a certain rule and its action may provide a change to the environment.

Each time an action is made, a reward signal returns.

What is to be maximized is a total sum of rewards over the future.

Learning starts from a state in which a result caused by an action is completely unknown or incompletely known. Once the machine tool (controller) actually operates, a result thereof can be obtained as data. In other words, searching an optimal action by trial and error is demanded.

By setting a state of learning in advance (method, such as the above supervised learning or inverse reinforcement learning) as an initial state, learning may be started from a good start point.

The "reinforcement learning" is a method in which not only determination and classification but also an action is learned, whereby, based on an interaction provided by the action to an environment, a proper action is learned, in other words, learning for maximizing a reward obtained in the future is learned. This indicates that, in the present embodiment, such an action as to effect the future can be obtained. For example, a case of Q learning, which is one of reinforcement learnings, will be described, which is not limitative.

The Q learning is a method of learning value Q (s, a) for selecting under a certain environment state "s" an action "a." In other words, under the certain state "s," an action "a" having the highest value Q (s, a) may be selected as the optimal action. However, at the beginning, with respect to a combination of state "s" and action "a," a correct value of value Q (s, a) is completely unknown. Then, an agent (subject of action) selects various actions "a" under certain state "s," and rewards are provided to actions "a" at that time. Thereby, the agent learns selection of a better action, i.e., correct value Q (s, a).

As a result of actions, to maximize a total sum of rewards obtained over the future, an object is to finally have Q (s, a)=E [$\Sigma \gamma^t r_t$] (expectation is made when the state changes in accordance with an optimal action. Of course, this is unknown and thus learning is to be performed while performing searching). Such an update equation of value Q (s, a) may be expressed by the following expression.

$$Q(s_t, a_t) \leftarrow Q(s_t, a_t) + \alpha \left( r_{t+1} + \gamma \max_a Q(s_{t+1}, a) - Q(s_t, a_t) \right)$$

$s_t$ represents the state of the environment at time t, and $a_t$ represents an action at time t. By action $a_t$, the state changes into $s_{t+1}$. $r_{t+1}$ represents a reward provided by the change of the state. Meanwhile, the term provided with max is one in which Q value when action a having the highest Q value known at that time is selected under state $s_{t+1}$ is multiplied by $\gamma$. $\gamma$ is a parameter within $0<\gamma \leq 1$ and called as discount percentage. $\alpha$ is a learning coefficient and falls within $0<\alpha \leq 1$.

The expression represents a method of updating estimation value Q ($s_t$, $a_t$) of action $a_t$ under state $s_t$ based on reward $r_{t+1}$ returned as a result of trial $a_t$. It is represented that when estimation value Q ($s_{t+1}$, max $a_{t+1}$) of best action max a under a next state according to reward $r_{t+1}$+action a is greater than estimation value Q ($s_t$, $a_t$) of action a under state s, Q ($s_t$, $a_t$) is increased, and, on the contrary, when the former is less than the latter, Q ($s_t$, $a_t$) is decreased. In other words, a value of a certain action under a certain state is configured to be near a value of a best action under a next state according to a reward immediately returned as a result and an action thereof.

Representation methods of Q (s, a) on a computer include a method of keeping, with respect to all state action pairs (s, a), values thereof as table (action value table), and a method of preparing such a function as to approximate Q (s, a). In the latter method, the above update equation may be realized by adjusting parameters of an approximation function using a method, such as stochastic gradient descent. As an approximation function, the neural network as described below may be used.

As an approximation algorithm of a value function in the supervised learning, the unsupervised learning, and the reinforcement learning, the neural network may be used. The neural network is configured by, for example, a computing device and a memory that realize a neural network imitating a neuron model as illustrated in FIG. 12.

Figure 12:
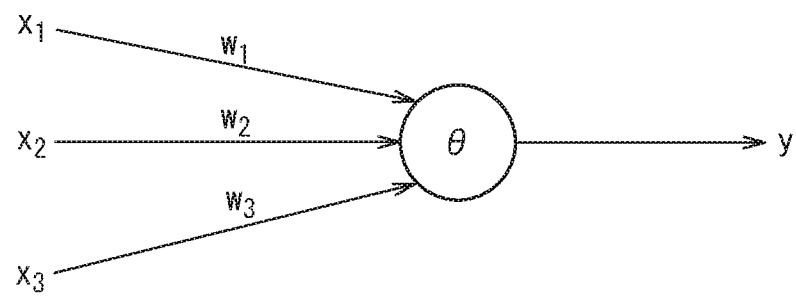
FIG. 12 is a schematic diagram illustrating a model of a neuron.

As illustrated in FIG. 12, a neuron is to output output y with respect to a plurality of input x (herein, as an example, inputs $x_1$ to $x_3$). Each input $x_1$ to $x_3$ is multiplied by weight w ($w_1 \sim w_3$) corresponding to the input x. Thereby, the neuron outputs output y expressed by the following equation. Note that input x, output y, and weight w are all vectors.

$$y = f_k(\Sigma_{i=1}^n x_i w_i - \theta)$$

$\theta$ is a bias, and $f_k$ is an activation function.

Figure 13:
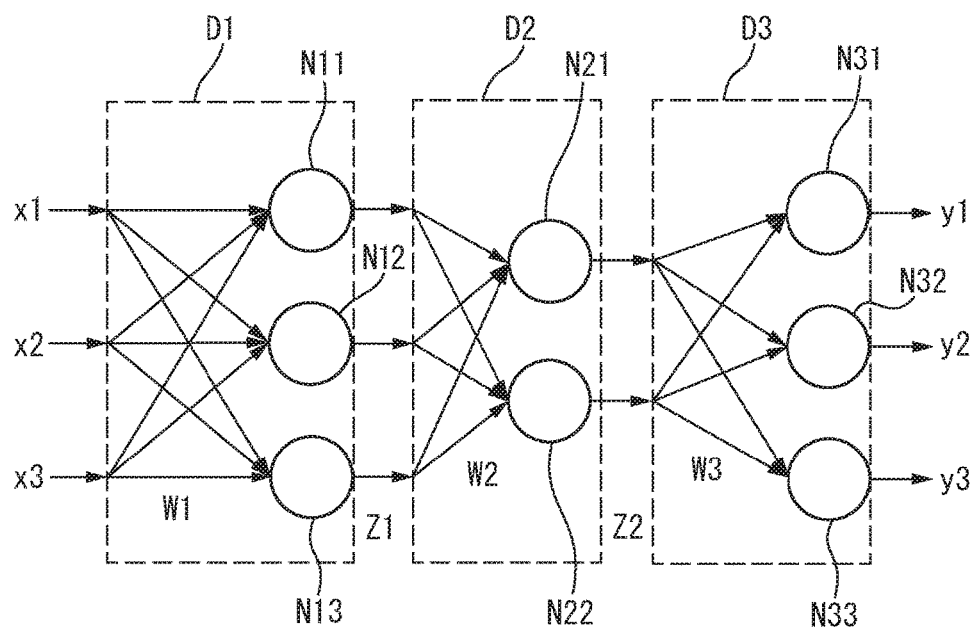
FIG. 13 is a schematic diagram illustrating a neural network having a three layer weight.

Next, a neural network having a three layer weight in which the above neurons are combined with each other will be described with reference to FIG. 13. FIG. 13 is a schematic diagram illustrating a neural network having a weight of three layers D1 to D3.

As illustrated in FIG. 13, a plurality of input x (herein, as an example, inputs x1 to x3) are input from the left side of the neural network, and results y (herein, as an example, results y1 to y3) is output form the right side.

Specifically, inputs x1 to x3 are multiplied by weights corresponding to each of three neurons N11 to N13, and then are input. The weights multiplied to the inputs are collectively indicated as w1.

Neurons N11 to N13 output z11 to z13, respectively. z11 to z13 are collectively indicated as feature vector z1, and can be considered as a vector that has extracted a feature amount of an input vector. Feature vector z1 is a feature vector between weight w1 and weight w2.

z11 to z13 are multiplied by weights corresponding to each of two neurons N21, N22, and then are input. The weights multiplied to the feature vectors are collectively indicated as w2.

Neurons N21, N22 output z21, z22, respectively. These are collectively indicated as feature vector z2. Feature vector z2 is a feature vector between weight w2 and weight w3.

Feature vectors z21, z22 are multiplied by weights corresponding to each of three neurons N31 to N33, and then are input. The weights multiplied to the feature vectors are collectively indicated as w3.

Lastly, neurons N31 to N33 output results y1 to y3, respectively.

In operations of the neural network, there are a learning mode and a value prediction mode, and, in the learning mode, weight w is learned using a learning data set, and in the prediction mode, an action determination is performed using parameters thereof (for convenience sake, prediction is referred to, but various tasks, such as detection, classification, inference, are possible).

Data actually obtained in the prediction mode may be immediately learned and reflected in a next action (online learning), while collective learning may be performed using a group of data collected in advance and a detection mode may be performed constantly using parameters thereof thereafter (batch learning). A learning mode that is intermediate therebetween may be inserted each time data is stored to some extent.

Weights w1 to w3 can be learned by the backpropagation. Information of errors enter from the right side and flows leftward. The backpropagation is a method of adjusting (learning) each weight in such a manner as to decrease a difference between output y and true output y (supervisor) when input x is input.

In such a neural network, layers can be increased to be three or more layers (called as deep learning). Feature extraction of input can be performed in a stepwise manner and a computing device that returns results can be automatically obtained only from supervised data.

According to the present invention, machine learning that determines an action value of a change amount of a tool compensation interval can be performed using a workpiece processing error amount and a machine tool working ratio as state variables, which allows the frequency of tool compensation to be optimized, a processing error to be restrained within a desired range, and the machine tool working ratio to be improved.

The invention claimed is:

1. A machine learning device for learning an action value with respect to a change of a tool compensation interval that is a time interval for compensating a tool in a machine tool, the device comprising:
   a state observation unit for observing the tool compensation interval of the machine tool, a processing error amount of a workpiece processed by the machine tool, and a machine working ratio of the machine tool as state variables;
   a learning unit for learning by associating the tool compensation interval, the processing error amount, and the machine working ratio that are observed by the state observation unit with a change amount of the tool compensation interval; and
   a decision making unit for determining a change amount of the tool compensation interval based on a result of learning by the leaning unit.

2. The machine learning device according to claim 1, wherein the learning unit includes:
   a reward calculation unit for calculating a reward based on the tool compensation interval, the processing error amount, and the machine working ratio, and
   a function update unit for creating or updating an action value table based on the tool compensation interval, the processing error amount, the machine working ratio, and the reward.

3. The machine learning device according to claim 2, wherein the decision making unit determines the change amount of the tool compensation interval based on the action value table.

4. The machine learning device according to claim 2, wherein the reward calculation unit provides a negative reward when the processing error amount increases or the machine working ratio decreases, and provides a positive reward when the processing error amount decreases or the machine working ratio increases.

5. The machine learning device according to claim 1, wherein the learning unit computes state variables observed by the state observation unit using a multilayer structure.

6. The machine learning device according to claim 2, wherein the function update unit updates the action value table thereof using an action value table updated by another learning machine device.

7. A machine tool including the machine learning device according to claim 1.

8. The machine tool according to claim 7, wherein the state observation unit further observes a temperature inside the machine tool, and wherein the learning unit learns by associating the tool compensation interval, the processing error amount, the machine working ratio, and the temperature inside the machine tool that are observed by the state observation unit with a change amount of the tool compensation interval.

9. A machine learning method for learning an action value with respect to a change of a tool compensation interval that is a time interval for compensating a tool in a machine tool, the method comprising:
   observing the tool compensation interval of the machine tool, a processing error amount of a workpiece processed by the machine tool, and a machine working ratio of the machine tool as state variables;
   learning by associating the tool compensation interval, the processing error amount, and the machine working ratio that are observed by the state observation unit with a change amount of the tool compensation interval; and
   determining a change amount of the tool compensation interval based on a result of the learning.

10. The machine learning method according to claim 9, wherein the learning includes:
    calculating a reward based on the tool compensation interval, the processing error amount, and the machine working ratio, and
    creating or updating an action value table based on the tool compensation interval, the processing error amount, the machine working ratio, and the reward.

* * * * *